W. Aldrich,
Turning Lathe,
Nº 12,662.  Patented Apr. 10, 1855.
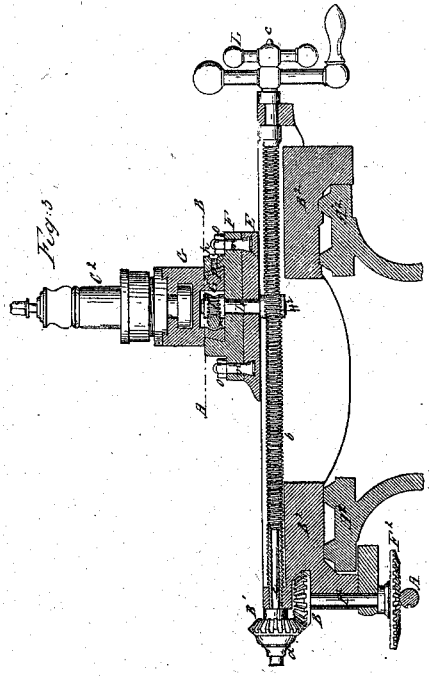
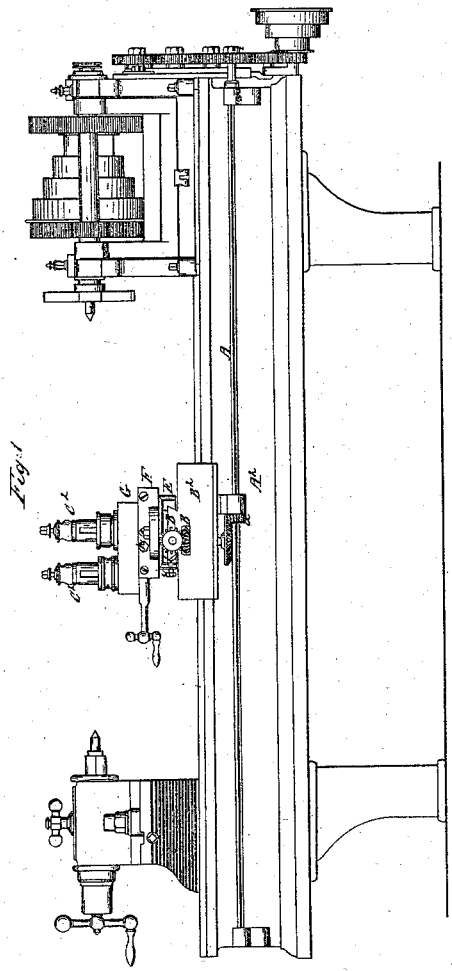
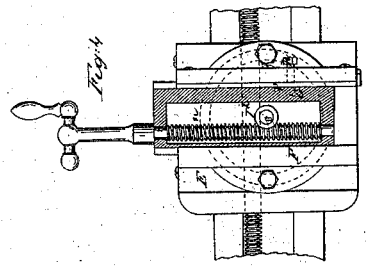
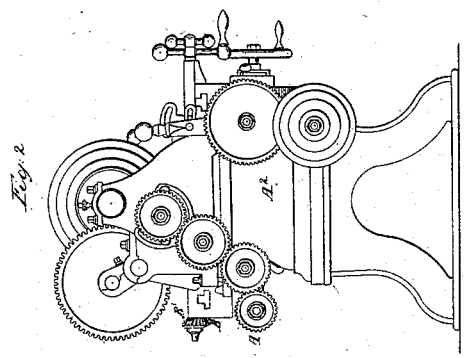

UNITED STATES PATENT OFFICE.

WARREN ALDRICH, OF LOWELL, MASSACHUSETTS.

LATHE.

Specification of Letters Patent No. 12,662, dated April 10, 1855.

*To all whom it may concern:*

Be it known that I, WARREN ALDRICH, of Lowell, in the county of Middlesex and State of Massachusetts, have invented a new and useful Improvement in Angular Traverse-Lathes; and I do hereby declare that the same is fully described and represented in the following specification and the accompanying drawings, letters, figures, and references thereof.

The said drawing exhibits a rear or back side view of the lathe, a cross section of it, and a horizontal section of the tool post carriage, the figures in said drawing being marked respectively 1, 2, 3 and 4.

In the said drawings $A^2$, denotes the main bed or frame of a turning lathe, on which rests and moves in a longitudinal direction a carriage $B^2$. This carriage supports a second carriage E, which is made to traverse upon it in a transverse direction or in one at right angles to that in which said carriage $B^2$, is moved on the frame $A^2$. The carriage E, is provided with one or more clamp screws $i$ or equivalent contrivances by which it may be clamped firmly to the carriage $B^2$, the said clamp screw or screws being made to operate in the usual manner against a gib $l$.

On the carriage E, is another carriage F, which is capable of being revolved horizontally thereon and of being confined in any position by clamp screws $m$, $m$, and nuts $o$, $o$; the heads of the screws being fixed in a dovetailed annular groove formed around in and below the top surface of the carriage E.

There is another carriage G, which may be termed the tool-post carriage, its object being to support one or more tool posts $C^2$; such carriage G, is adapted to the carriage F, so as to traverse or slide on it horizontally in a rectilinear direction, and it is provided with a clamp screw as seen at $h$ in Figs. 1, 3 and 4, such screw being made to operate against a gib $p$, that rests against the dovetail G', of the carriage G.

A shaft D, extends up through the middle of the two carriages E and F, and through a cylindrical passage whose diameter corresponds with that of the shaft, and so as to permit the shaft to freely rotate in the carriages and on its axis. This shaft is provided with two worm gears $H^2$, $I^2$—the upper of which works into a screw $n$, supported in the tool carriage G, as seen in Figs. 3 and 4. The other worm gear (H') engages with a long screw $b$, sustained by the carriage $B^2$.

A splined shaft A, is arranged alongside of the frame $A^2$. It may be driven from the headstock by suitable gearing, in order that it may impart rotary motion to a beveled gear $a$, supported by the carriage $B^2$. The said gear $a$, works into a gear $F^2$ fixed on the lower end of a vertical shaft $P^2$ (see Fig. 3) which carries another beveled gear B, that works into a gear B', fitted to turn loosely on a journal projecting from the hollow or tubular screw $b$. The gear B' is clamped to the shaft, at will, by means of a long screw rod $c$, whose friction button or head, $d$, is drawn against the gear by means of a clamping screw nut L, see Fig. 3; such clamping nut serving to draw the gear up to a shoulder formed on the shaft or journal of the screw.

If we now suppose the gear B', to be clamped to the screw $b$, the said screw $b$ put in revolution, the screw $i$ tightened or screwed hard up, and the screw $h$, to be unscrewed or loose; under this state of things the spindle D, will be revolved and by the action of its worm gear, $I^2$, in the screw $n$, the block or carriage G, will be caused to traverse in a rectilinear path whatever may be the direction given to such path, by the adjustment of the carriage F on the carriage E. If the screw $h$, be tightened and the screw $i$ loosened, the spindle D cannot revolve, consequently the carriage E, carrying with it the carriages or blocks F and G, will be made to traverse on the main carriage $B^2$ in the direction of the screw $b$.

Figs. 1 and 2 of the drawings exhibit besides my invention as above described sundry parts of a turning lathe to which no reference need be made as they constitute no part of my invention, and are common to lathes, and will be understood by any skillful machinist.

I do not herein claim a combination of a tool-rest or carriage, a rotary carriage, and a sliding carriage together and with a mechanism of such character or construction as will impart to such tool-post carriage an automatic traverse motion in whatever position its supporting or turning carriage may be disposed and fixed on the carriage by which it is sustained; nor do I herein claim the peculiar mechanism connected with the three carriages and described in the specification of my Letters Patent, dated March 15th, A. D. 1853, such combination being composed of what are therein exhibited as the splined shaft U, the movable bevel gear V, the vertical shaft and its bevel gears W, Y, Y, the horizontal shaft X, gears $c$, $g$, and screw I, and its female screw affixed to the tool rest carriage H.

Having invented a simpler combination of mechanical parts for such purpose, and which although an equivalent to an element or device in the combination wherein it is employed, is by no means analogous to such device or element, and is much superior in many respects.

I herein claim—

Such combination when used in connection with the three carriages as described; the same consisting of a long screw $b$, a vertical shaft D, two worm gears $H^2$, $I^2$, and a screw $n$, arranged, applied, and made to operate together substantially as specified.

In testimony whereof I have hereunto set my signature this eighteenth day of October A. D. 1854.

WARREN ALDRICH.

Witnesses:
ABIEL HOLT,
A. F. L. NORRIS.